Nov. 29, 1960 J. SNYDER 2,962,696
MUZZLE BLAST SOUND WAVE DETECTION APPARATUS
Filed Dec. 27, 1950 2 Sheets-Sheet 2
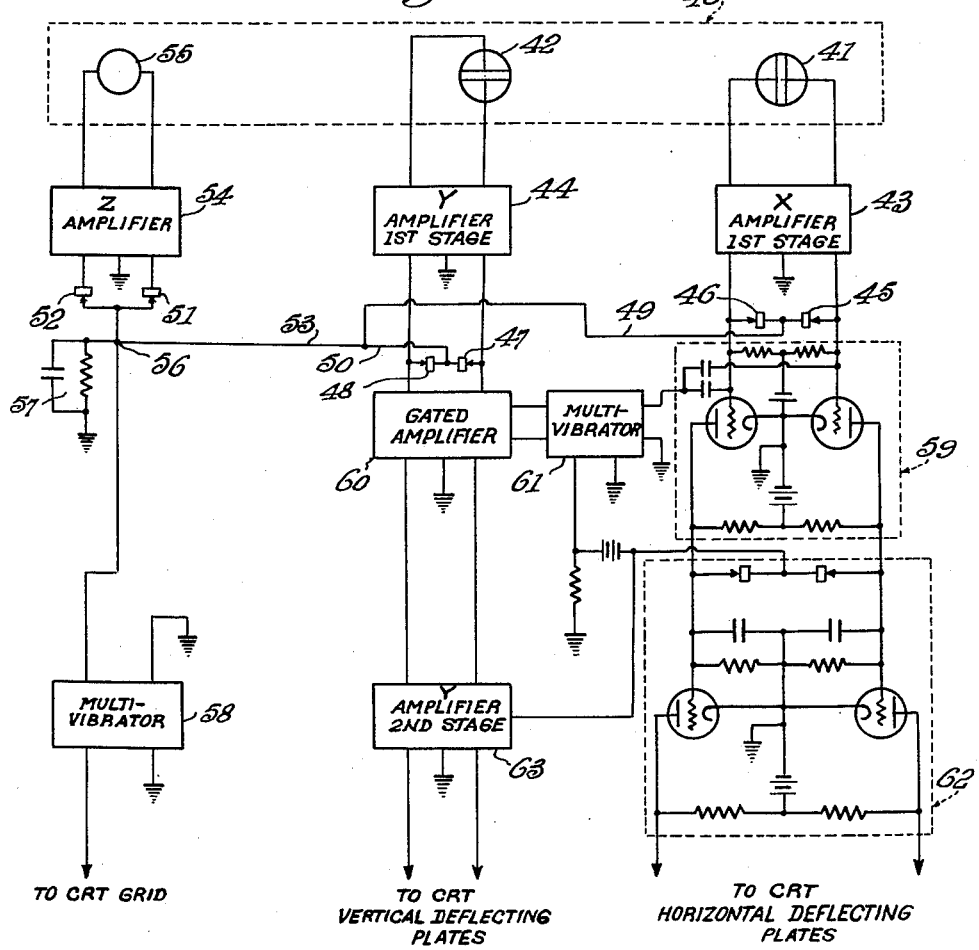
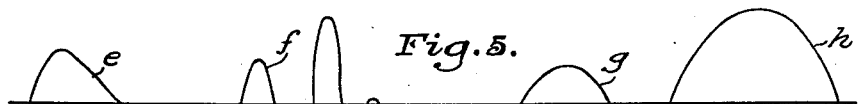
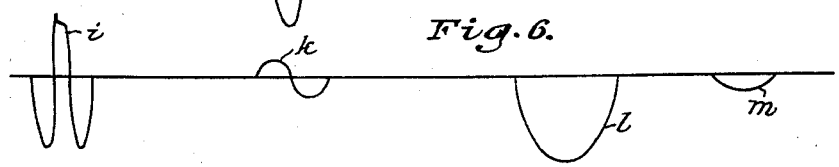
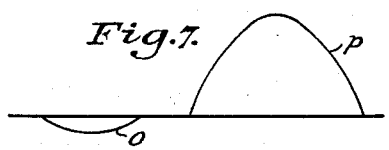
INVENTOR.
JAMES SNYDER
BY Harry M. Saragovitz
ATTORNEY

# United States Patent Office 2,962,696
Patented Nov. 29, 1960

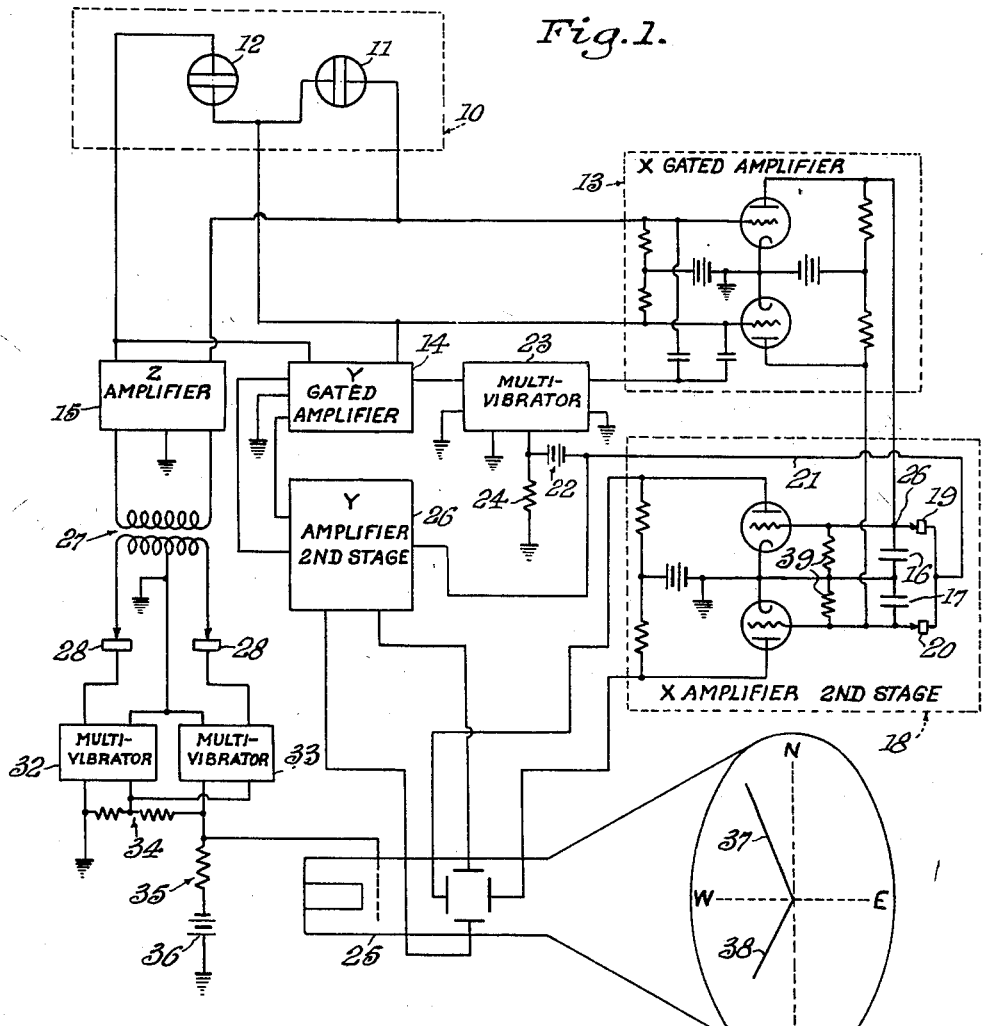

2,962,696

MUZZLE BLAST SOUND WAVE DETECTION APPARATUS

James Snyder, Belmar, N.J., assignor to the United States of America as represented by the Secretary of the Army Filed Dec. 27, 1950, Ser. No. 202,998

14 Claims. (Cl. 340—16)

(Granted under Title 35, U.S. Code (1952), sec. 266)

The invention described herein may be manufactured and used by or for the Government for governmental purposes, without the payment to me of any royalty thereon.

This invention relates to the determination of the direction of propagation of sound wave energy.

One method for locating the origin of sound waves comprises two or more spaced stations, each station including apparatus for indicating the bearing of the source of sound waves. When two or more bearings and the distances between the stations are known, the exact source of gun fire or other generated sound waves is easily ascertained.

The difficulties encountered in such a system include determining the arrival direction of the sound waves, instead of a bearing that has a 180 degree ambiguity, and the detection and indication of the proper waves. Both of these problems concern the specific apparatus of an observation station.

The first difficulty, that of a 180 degree ambiguity in the direction of propagation of the sound waves, is resolved by the use of cosine law microphones in combination with other apparatus. The cosine law microphone derives its name from its electrical response to compressional waves. The output of the microphone is directly proportional to the cosine of the angle between the incident sound waves and the sensitivity axis of the microphone. Therefore, each microphone has a figure eight directional pattern. The cosine law microphone has the further characteristic of responding to energy waves from different directions with different polarities. Thus, if a microphone responds to a compression from 0 degrees with a positive polarity, it will respond to a compression from 180 degrees with a negative polarity. Applying these properties to the specific problem at hand, since it is well known that the first sound wave from gun fire or other explosion is always compressional, if the microphonic signal is cut off immediately after the first half cycle is amplified, the polarity of this half cycle will indicate the directional sense of the incoming sound waves.

The second problem is to distinguish between muzzle blasts and ballistic waves, both of which are inherent in gun fire. The muzzle blasts comprise trains of sound waves comprised predominately of frequencies up to 400 cycles produced by the actual explosion propelling the projectile, while the ballistic waves are compressional shock waves comprised predominately of frequencies from 700 cycles to over 5000 cycles set up by the projectile while in flight. It is apparent that if an accurate determination of the gun emplacement is to be accomplished, the sound waves generated by the muzzle blast must be utilized and the ballistic waves must be rejected. In prior devices, filters were used to discriminate between the two types of waves, but this proved unsatisfactory because it was impossible to remove all traces of the ballistic waves. In general, the present invention utilizes the difference in the ballistic wave and muzzle blast waveforms to effectively discriminate between the two for purposes of direction finding.

In accordance with the above, it is the principal object of this invention to provide a sound wave energy detector that will accurately indicate the absolute direction of propagation of a predetermined type of sound wave energy.

Another object of this invention is to provide a wave energy detector including a plurality of microphones and a cathode ray tube that will accurately and efficiently determine the direction of propagation of a train of sound waves having a predetermined waveform.

A further object of this invention is to provide a wave energy detector including a plurality of directional microphones coupled by amplifiers to a cathode ray tube, that will accurately determine the direction of propagation of muzzle blasts of one frequency and waveform while remaining insensitive to ballistic waves of a different frequency and waveform.

These and further objects of this invention will be more fully understood when the following description is read in connection with the drawing wherein:

Fig. 1 is a circuit diagram of a station in accordance with one embodiment of the invention, Figs. 2 and 3 illustrate the waveforms of the signals generated at the station illustrated in Fig. 1 in response to sound waves, Fig. 4 is a circuit diagram of a station in accordance with a further embodiment of the invention, and Figs. 5 to 7 show the waveforms of the signals generated at the station illustrated in Fig. 4 in response to sound waves.

The device to be particularly described hereinafter utilizes certain characteristics of sound waves generated by gun fire to indicate both the direction of propagation of the waves and the absolute sense of this propagation. This is achieved by the reception of the sound waves in question by two cosine law microphones disposed with their axes of sensitivity in quadrature, the outputs of these instruments coupled by amplifiers to a cathode ray tube. The tube will indicate the bearing of detected sound waves only if the waves are of a predetermined variety. Further, immediately after the signal generated in response to the first compression of the train of sound waves is amplified, the amplifiers will be blocked in order to provide an indication of absolute sense of direction of the sound waves.

Referring now to Fig. 1 in detail, a unit 10 includes two cosine law microphones 11, 12, which may be of the hot-wire type, connected to X gated amplifier 13 and Y gated amplifier 14, respectively. The physical spacing of microphones 11, 12 is not critical so long as their axes of sensitivity are disposed in quadrature relation. Both microphones are also connected, preferably in series relation, to Z amplifier 15. The X gated amplifier 13 is shown as a conventional balanced amplifier utilizing a pair of triodes connected back to back, and amplifiers Y and Z may also take this form. A conventional balanced triode amplifier, comprising the 2nd stage of the X channel, has its output applied to the horizontal deflecting plates of a conventional cathode ray tube 25. Indicia on the screen of tube 25 is preferably rotatable in any well known manner.

The output leads from amplifier 13 are connected across condensers 16, 17 in a unit 18. Also connected across condensers 16, 17 are grid resistors 39 and rectifiers 19, 20 in series opposition, their juncture coupled by lead 21 to the positive side of a battery 22. The negative side of battery 22 is connected to a multivibrator 23 and a resistor 24. Multivibrator 23, which is any conventional type one-shot circuit, has its output connected to the grids of the triodes in the X and Y gated amplifiers 13, 14.

For convenience, the circuit components connected to the horizontal deflecting plates of cathode ray tube 25 including microphone 11 will be referred to as the X chanel and the circuit components connected to the vertical deflecting plates including microphone 12 will be referred to as the Y channel. The output signals from microphone 12 are applied through channel Y to the vertical deflecting plates of cathode ray tube 25 through amplifiers 14, 26 which are identical to amplifiers 13 and 18 in channel X.

Preferably, the sum of the signals generated by microphones 11, 12 are fed into Z amplifier 15. The waveform of the resultant signal is almost identical with the waveform of an individual microphonic response signal. This is due to the fact that the microphones are spaced so that the distance between them is very small compared to the wave length of the detected sound waves. Therefore, the phase shift between signals from microphones 11, 12 will be so small as to have a negligible effect upon the waveform of the resultant signal. The individual microphonic signals could be fed to amplifier 15 but since the signal level would be lower if these signals were utilized, the resultant signal is preferable. The output leads of amplifier 15 are joined to a peaking circuit, in this case shown as a peaking transformer 27 of any conventional design. For a discussion of this type transformer, reference may be had to M. M. Morack, "Voltage Impulses for Thyratron Grid Control," G. E. Rev., 37 (1934), 288–295. The center tapped secondary of transformer 27 is connected to conventional one-shot multivibrators 32, 33 through rectifiers 28, 29. The outputs of these one-shot circuits are added by a resistance network 34, and the combined output applied to a resistor 35, tied to ground through a bias cell 36.

The operation of Fig. 1 will be explained utilizing the waveforms illustrated in Figs. 2 and 3 to aid in a fuller understanding of the ballistic wave suppression. Assuming gunfire at any location within the effective range of this apparatus, microphones 11, 12 will generate signals in response to the ballistic waves and muzzle blasts. The magnitude of the output signals of the microphones will be proportional to the cosine of the angle between the sensitivity axis of the microphones and the direction of the incoming waves, this being the normal response of any cosine law microphone.

The electric signal output of the microphones 11, 12 will be of the waveforms shown in Fig. 2. Signal $a$ is the microphonic response to the ballistic wave and signal $b$ is the response to the muzzle blast. As mentioned above, the wave front from an explosion is always a compression, which in this instance is represented by the first positive loop in waveform $b$. If the direction of propagation of the sound waves was reversed 180 degrees, signal $b$ would then have a negative loop indicating this compression.

When the sound waves from the muzzle blast excite microphones 11, 12, it will be assumed that the response signal of microphone 11 is the greater in amplitude. It is necessary to make this assumption to indicate the manner in which multivibrator 23 is triggered, and it will be apparent from the following description that the channel carrying the signal of greater amplitude will trigger multivibrator 23.

When the first half cycle of wave $b$ is applied to condensers 16, 17 through amplifier 13, the voltage at, for example, a point 26 will increase either positively or negatively depending upon the direction the sound wave is traveling. Assuming the increase to be positive, when condenser 16 is charged to a potential sufficient to overcome the voltage of battery 22, current will flow through rectifier 19, battery 22 and resistor 24 to ground. This will create a positive voltage pulse across resistor 24, thereby triggering multivibrator 23. The negative output signal of this circuit is applied to the grids of the tubes in amplifier 13 to effectively block this amplifier. Since this action takes place during the first half cycle of signal $b$, the remainder of the signal is blocked. This half cycle signal is then applied to the horizontal deflecting plates of cathode ray tube 25 by amplifier 18 in a manner more fully set forth below. The signal from microphone 12 will be similarly passed through the Y amplifiers and applied to the vertical deflecting plates. Since the electrical output of the microphones 11, 12 is proportional to the cosine of the angle between the incoming wave and the microphone sensitivity axes, the voltages applied to the deflecting plates of cathode ray tube 20 will deflect the electron beam in a pattern representative of the direction of propagation of the sound wave.

The signal from amplifier 18 that is impressed upon the horizontal deflecting plates of cathode ray tube 25 due to the initial charging of condenser 16 will not be displayed on tube 25, due to the blocking voltage on the tube grid from battery 36. Therefore, it is apparent that a positive voltage must be generated to gate tube 25 and that this voltage must be generated only upon the reception by microphones 11, 12 of a muzzle blast. This gating voltage is generated by the following action: The signals from microphones 11, 12 are applied to the Z amplifier, and its output signals coupled to multivibrators 32, 33 by peaking transformer 27 and rectifiers 28, 29. The microphonic signal generated in response to a muzzle blast has both positive and negative loops which are amplified and peaked as shown in Fig. 3, wave $d$. Since pulse type signal $d$ has loops of two polarities, current will flow alternately through rectifiers 28 and 29 thereby triggering both multivibrators 32 and 33 which are of the one-shot variety. The output pulses of these circuits are of sufficient duration to overlap and are effectively added by network 34 and applied across resistor 35. This voltage will be of sufficient amplitude to overcome the negative bias on the grid of tube 25, thereby allowing the electron beam to trace a pattern on the screen of cathode ray tube 25 in response to the signals applied to the deflecting plates by amplifiers 18, 26.

The signals supplied to the horizontal deflecting plates are due to condensers 16, 17 charging from amplifier 13 and subsequently discharging through grid resistors 39. The time constants of the condenser charge and discharge circuits are made of sufficient duration so that condensers 16, 17 do not charge to the peak voltage of the first loop of the signal before cathode ray tube 25 is gated and the condenser discharge is of sufficient duration to allow a pattern to be traced on the screen of the cathode ray tube, but not so long as to prevent the resolution of a desired large number of indications. The Y channel operates in an identical manner.

The response of microphones 11, 12 to a ballistic wave will be a signal of one polarity as shown in Fig. 2 by wave $a$. This signal when amplified and passed through peaking transformer 27 will be a pulse of one polarity, illustrated in Fig. 3, curve $c$. This will trigger one of the multivibrators 32, 33, depending upon the polarity of the pulse, and the voltage output of this trigger circuit will not be sufficient to overcome the effect of bias battery 36 on the grid of tube 25. Therefore, it is evident that for the cathode ray tube 25 to indicate the direction of propagation of sound waves, the waves must excite the microphone in such a manner that a signal with positive and negative loops will be generated. Thus, even though microphones 11, 12 generate a signal in response to a ballistic wave and this signal is amplified and applied to the deflecting plates of cathode ray tube 25, tube 25 will not display any pattern since it will remain blocked, due to the negative bias on its grid.

To clarify the manner of direction indication of the muzzle blast, reference is made to lines 37, 38 on the screen of cathode ray tube 25. Assuming a muzzle blast traveling from the northwest, the circuit elements are arranged in relation to microphones 11, 12 so that line 37 is traced on the screen of cathode ray tube 25. This is accomplished by connecting the circuit polarities so that the signal generated by microphone 11 and applied to the left horizontal deflecting plate is positive. The same is true for the Y channel where the upper vertical deflecting plate will be positive. It is obvious that this same analysis holds true for a sound wave traveling in any direction. Now since the amplitude of the signals from microphones 11 and 12 is proportional to the direction of propagation of the waves, the deflecting plates will add these two signals and the resultant line 37 will indicate the absolute direction of travel of the sound waves in question. As a further example, line 38 will be traced upon the detection of a sound wave traveling from the southwest. It is obvious that either unit 10 or the indicia on the screen of cathode ray tube 25 must be rotated so that unit 10 and tube 25 will be properly orientated to accurately indicate the direction of arrival of sound waves.

A second embodiment of the invention is shown in Fig. 4. It responds to sound waves in much the same manner as the apparatus of Fig. 1 except for the method of ballistic wave suppression. The X and Y channels are similar to the same channels of the apparatus described and shown in Fig. 1. Microphones 41, 42 of a unit 40 are cosine law compressional type instruments physically arranged with their axes of sensitivity at 90 degrees. They are connected to the 1st stages of X and Y amplifiers 43, 44, respectively. Rectifiers 45, 46 and 47, 48 are connected in series opposing relation across the outputs of amplifiers 43 and 44 respectively. Leads 49 and 50, tied to the juncture of the rectifiers 45, 46 and 47, 48, are joined and connected to a point 56 by a lead 53. Rectifiers 51, 52 are connected in series opposing relation across the output leads of Z amplifier 54, which may be similar to Z amplifier 15. Coupled to the input leads of Z amplifier 54 is a microphone 55, of a different type than previously mentioned microphones 41 and 42. The juncture of rectifiers 51, 52 is also connected to point 56 which is tied to ground through an RC circuit 57. Point 56 is also coupled to a one-shot multivibrator 58, responsive to positive signals, which in turn sends pulses to a cathode ray tube grid.

The remainder of channels X and Y are constructed in the same manner as that described in the embodiment shown in Fig. 1, gated amplifiers 59 and 60 together with multivibrator 61 performing the functions of amplifiers 13, 14 and multivibrator 23. The 2nd stages of X and Y amplifiers 62 and 63 are coupled to the deflecting plates of a cathode ray tube, similar to the arrangement of Fig. 1.

The operation of this apparatus will be described with reference to the waves illustrated in Figs. 5, 6 and 7. Microphones 41 and 42 will respond to a muzzle blast with signals of waveform $f$ illustrated in Fig. 5. After amplification, these signals will be rectified and smoothed by rectifiers 45, 46 and 47, 48 and RC circuit 57, and the resultant signal of waveform $h$ impressed across RC circuit 57. The signals from microphones 41 and 42 will also pass through gated amplifiers 59, 60, excite multivibrator 61 and be applied to the deflection plates of a cathode ray tube. These operations will be performed as described in connection with Fig. 1.

Microphone 55, as mentioned above, is a different type than the previously described microphones, and designed to generate signals of different waveforms than microphones 41, 42 in response to ballistic waves and muzzle blasts. For example, the microphone 55 may be a velocity ribbon microphone if microphones 41, 42 are hot wire microphones. Other various types of microphones may be utilized if their response to sound waves differs as is set out below.

The wave $k$ illustrated in Fig. 6 represents a signal generated by microphone 55 in response to a muzzle blast. When passed through rectifiers 51, 52 and smoothed by RC circuit 57, a signal of waveform $m$ will result. The addition of waves $h$ and $m$ produces a signal of waveform $p$, illustrated in Fig. 7, and this signal is supplied to multivibrator 58. Since wave $p$ is a positive signal, the multivibrator 58 will be triggered, applying a positive gate to the cathode ray tube grid so that a pattern may be traced on the tube screen as explained more fully in connection with Fig. 1.

When a ballistic wave excites microphones 41, 42, a signal of waveform $e$ will be generated at each microphone which, after rectification and smoothing, takes the form shown by wave $g$ across RC circuit 57. Microphone 55 responds to the same ballistic wave with a signal of waveform $i$, which after rectification and smoothing has the form of wave $l$. The proper addition of signals $g$ and $l$ produces the resultant wave $0$ which may be zero or slightly negative as here illustrated. This signal will not trigger multivibrator 58, because it is not of the correct polarity, multivibrator 58 being responsive only to positive signals. This results in the cathode ray tube remaining blocked and not in condition to indicate the signals from microphones 41 and 42. Therefore, the system effectively discriminates between muzzle blasts of one frequency and wavefrom and ballistic waves of a different frequency and waveform, indicating the former and rejecting the latter.

It is obvious that the discrimination between energy waves of different frequency and waveform could be accomplished with non-directional as well as the directional microphones described. Further, other media than air could be explored for sound waves and the direction of propagation thereof.

While there has been described what is at present considered a preferred embodiment of the invention, it will be obvious to those skilled in the art that various changes and modifications may be made therein without departing from the invention, and therefore, the appended claims cover all such changes and modifications that fall within the true spirit and scope of the invention.

What is claimed is:

1. A system for determining the direction of propagation of predetermined sound waves intermixed with a plurality of other sound waves comprising a plurality of directional microphones responsive to said waves for generating a plurality of indicating voltages and control voltages, indicating means, first means for supplying said indicating voltages to said indicator, means responsive to said indicating voltages for blocking said first means a predetermined interval of time after the detection of said waves, a control circuit responsive to control voltages generated by said predetermined sound waves coupled to said indicating means, means for supplying said control voltages to said control circuit so that when said control voltages are generated by said predetermined sound waves, said indicator will be responsive to said indicating voltages.

2. A system as defined in claim 1 wherein said indicating means includes a cathode ray tube.

3. Apparatus for distinguishing between sound waves emanating from gun fire including muzzle blasts and ballistic waves and for determining the direction of propagation of said muzzle blasts comprising a plurality of microphones, including at least two directional microphones, for the detection of said sound waves responsive to each of said waves for generating a plurality of indicating voltages and control voltages, an indicator, first means for supplying said indicating voltages to said indicator, means responsive to said indicating voltages for blocking said first means a predetermined interval of time after the detection of said sound waves, control means, said indicator operative in response to said control means, means for supplying said control voltages to said control means, said control means responsive to said control voltages generated by said muzzle blasts for rendering said indicator responsive to said indicating voltages generated by said muzzle blasts.

4. Apparatus as defined in claim 3 wherein said indicator is a cathode ray tube.

5. Apparatus for distinguishing between sound waves emanating from gun fire including muzzle blasts and ballistic waves and for determining the direction of propagation of said muzzle blasts comprising a plurality of directional microphones, each of said microphones responsive to said waves for generating indicating voltages and the combination of said microphones responsive to said waves for generating control voltages, an indicator, means for supplying said indicating voltages to said indicator, control means coupled to said indicator for rendering said indicator operative, means for supplying said control voltages to said control means, said indicator being operative when said control voltages are generated in response to said muzzle blasts.

6. Apparatus for discrimination between ballistic wave and muzzle blast sound waves emanating from gun fire and for determining the direction of propagation of said muzzle blast sound waves comprising a plurality of directional microphones, each of said microphones responsive to said sound waves for generating indicating voltages, said microphones in combination responsive to said sound waves for generating control voltages, a normally blanked cathode ray tube, trigger means coupled to said tube, means for coupling said indicating voltages to said tube, means for coupling said control voltages to said trigger means, said control voltages generated in response to said muzzle blasts exciting said trigger means and the output signals of said trigger means unblanking said tube so that the direction of propagation of said muzzle blasts will be indicated by said tube.

7. Apparatus for discriminating between ballistic wave and muzzle blast sound waves emanating from gun fire and for determining the direction of propagation of said muzzle blast sound waves comprising two directional microphones, each of said microphones responsive to said sound waves for generating indicating voltages, said microphones in combination responsive to said sound waves for generating control voltages, a cathode ray tube including horizontal and vertical deflecting plates and a normally negatively biased grid, trigger means coupled to said grid, means for coupling said indicating voltages from one of said microphones to said horizontal deflecting plates, means for coupling said indicating voltages from the other of said microphones to said vertical deflecting plates, means for supplying said control voltages to said trigger means, said control voltages generated in response to said muzzle blasts exciting said trigger means, the output signals of said trigger means overcoming said negative bias so that said cathode ray tube will indicate the direction of propagation of said muzzle blasts.

8. In a system for detecting the first compression of a train of sound waves, a microphone responsive to said sound waves for generating an alternating signal, the first half cycle of said signal generated in response to said first compression, a normally inoperative circuit for generating a blocking voltage gate, a gated amplifier, said amplifier controlled by said circuit, said circuit excited in response to the transmission of said first half cycle by said amplifier and generating said gate for blocking said amplifier so that only the first half cycle of said signal is passed by said amplifier.

9. In a system for detecting the first compression of a train of sound waves, a microphone responsive to said sound waves for generating an alternating signal, the first half cycle of said signal generated in response to said first compression, a trigger circuit, a gated amplifier, said amplifier controlled by said trigger circuit, two condensers serially connected across the output of said amplifier and a pair of rectifiers connected across said condensers, a bias battery opposing the flow of current through said rectifiers, a load resistor connected between said trigger circuit and ground, said bias battery connected to the terminal of said trigger circuit and said load resistor, said first half cycle transmitted by said amplifier charging said condensers to a value in excess of said bias cell whereby one of said rectifiers, depending upon the polarity of said first half cycle, will conduct current, said current flowing through said load resistor to ground thereby applying a positive voltage pulse to said trigger circuit, said circuit being triggered upon the reception of said pulse, the output pulse of said trigger circuit blocking said amplifier so that only said first half cycle is transmitted by said amplifier.

10. Apparatus for discriminating between ballistic wave and muzzle blast sound waves emanating from gun fire and for determining the direction of propagation of said muzzle blast sound wave comprising two directional microphones, each of said microphones responsive to said sound waves for generating indicating voltages, a third microphone, having different characteristics than said two microphones, responsive to said sound waves for generating control voltages, a normally inoperative cathode ray tube for indicating the direction of propagation of said muzzle blasts, trigger means coupled to said tube, means for coupling said indicating voltages to said tube, means for coupling said control voltages to said trigger means, means for coupling said indicating voltages to said trigger means, said trigger means producing pulses in response to the combination of said control voltages and said indicating voltages when said voltages are generated by said muzzle blasts, said pulses rendering said tube operative, so that the direction of propagation of said muzzle blast will be indicated by said cathode ray tube.

11. Apparatus for discriminating between ballistic wave and muzzle blast sound waves and for determining the direction of propagation of said muzzle blast sound waves comprising two directional microphones, each of said microphones responsive to said sound waves for generating indicating voltages, a third microphone, having different characteristics than said two microphones, responsive to said sound waves for generating control voltages, a cathode ray tube including horizontal and vertical deflecting plates and a normally negatively biased grid, trigger means coupled to said grid, means for coupling said indicating voltages from one of said microphones to said horizontal deflecting plates, means for coupling said indicating voltages from the second of said microphones to said vertical deflecting plates, means for coupling said control voltages from said third microphone to said trigger means, means for coupling said indicating voltages to said trigger means, said trigger means producing pulses when triggered by voltages which are the sum of said control voltages and said first voltages when said indicating and control voltages are generated in response to said muzzle blasts, said pulses overcoming said negative bias so that said cathode ray tube will indicate the direction of propagation of said muzzle blasts.

12. Apparatus for discriminating between ballistic wave and muzzle blast sound waves comprising two directional microphones, each of said microphones responding to said ballistic waves and said muzzle blasts with first and second signals respectively, having first and second waveforms respectively, said microphones in combination responding to said ballistic waves and said muzzle blasts with third and fourth signals respectively having said first and second waveforms respectively, a normally inoperative indicator, means transmitting a portion of said first and second signals to said indicator, means responsive to said fourth signals for rendering said indicator operative.

13. Apparatus for discriminating between ballistic wave and muzzle blast sound waves emanating from gun fire and for determining the direction of propagation of muzzle blast sound waves comprising two directional microphones responding to said ballistic waves and said muzzle blasts with first and second signals respectively, having first and second waveforms respectively, a third microphone, having different characteristics than said two microphones, responding to said ballistic waves and said muzzle blasts with third and fourth signals respectively, having third and fourth waveforms respectively, a normally inoperative indicator for indicating the direction of propagation of said muzzle blasts, means transmitting a portion of said first and second signals to said indicator, means for rectifying and smoothing all of said signals generated in response to one of said sound waves and combining said rectified signals, means responsive to the combination of said signals generated in response to said muzzle blasts for rendering said indicator operative.

14. Apparatus as defined in claim 13 wherein said indicator is a cathode ray tube.

References Cited in the file of this patent

UNITED STATES PATENTS

| | | |
|---|---|---|
| 1,534,205 | Fessenden | Apr. 21, 1925 |
| 2,257,187 | Owen | Sept. 30, 1941 |
| 2,406,014 | Harry | Aug. 20, 1946 |
| 2,434,644 | Fairweather | Jan. 20, 1948 |